(12) United States Patent
Raybon

(10) Patent No.: US 10,486,643 B1
(45) Date of Patent: Nov. 26, 2019

(54) EMERGENCY ESCAPE TOOL

(71) Applicant: Evelyn Raybon, Barefoot Bay, FL (US)

(72) Inventor: Evelyn Raybon, Barefoot Bay, FL (US)

( * ) Notice: Subject to any disclaimer, the term of this patent is extended or adjusted under 35 U.S.C. 154(b) by 0 days.

(21) Appl. No.: 16/224,186

(22) Filed: Dec. 18, 2018

(51) Int. Cl.
B60R 22/32 (2006.01)
B60R 21/02 (2006.01)
B25D 1/00 (2006.01)
A62B 3/00 (2006.01)
B60R 21/00 (2006.01)

(52) U.S. Cl.
CPC .............. *B60R 22/32* (2013.01); *A62B 3/005* (2013.01); *B25D 1/00* (2013.01); *B60R 21/02* (2013.01); *B25D 2250/271* (2013.01); *B25D 2250/295* (2013.01); *B60R 2021/0016* (2013.01); *B60R 2021/022* (2013.01); *B60R 2022/328* (2013.01)

(58) Field of Classification Search
CPC . B60R 22/32; B60R 21/02; B60R 2021/0016; B60R 2021/022; B60R 2022/328; A62B 3/005; B25D 1/00; B25D 2250/271; B25D 2250/295
USPC ...................................................... 7/100, 144
See application file for complete search history.

(56) References Cited

U.S. PATENT DOCUMENTS

| 5,657,543 | A | 8/1997 | Collins | |
| 6,467,114 | B1 | 10/2002 | Sigl | |
| 7,028,874 | B2 | 4/2006 | Lin | |
| 7,988,078 | B1 * | 8/2011 | Roy | A62B 3/005 241/33 |
| 8,015,643 | B2 * | 9/2011 | White | A62B 3/005 7/144 |
| 8,146,192 | B2 * | 4/2012 | McGlynn | A62B 3/005 224/162 |
| 9,254,560 | B2 * | 2/2016 | Rubin | B25F 1/006 |
| 9,499,122 | B2 * | 11/2016 | Nowak | B60R 22/322 |

FOREIGN PATENT DOCUMENTS

| WO | WO-2011022863 A1 * | 3/2011 | A62B 3/005 |
| WO | WO-2017085336 A1 * | 5/2017 | B60R 22/32 |

* cited by examiner

Primary Examiner — Hadi Shakeri
(74) Attorney, Agent, or Firm — Dale J. Ream

(57) ABSTRACT

An emergency escape tool for quick escape from a crashed automobile includes a body member defining an interior area. The walls of the body member define a slot and a blade is mounted therein, the blade being capable of severing a seatbelt of the automobile. The emergency escape tool includes a hammerhead portion coupled to the upper end of the body member and having a conical shape and a tip extending away from the upper end that is operable to break the glass window of the automobile. An immersion sensor is coupled to the body member and operable to detect immersion in water. The body member may be coupled to a seat of the automobile. A discharge member is associated with the body member and is operable to release the body member away from a mounting portion if immersion in water is detected.

19 Claims, 17 Drawing Sheets

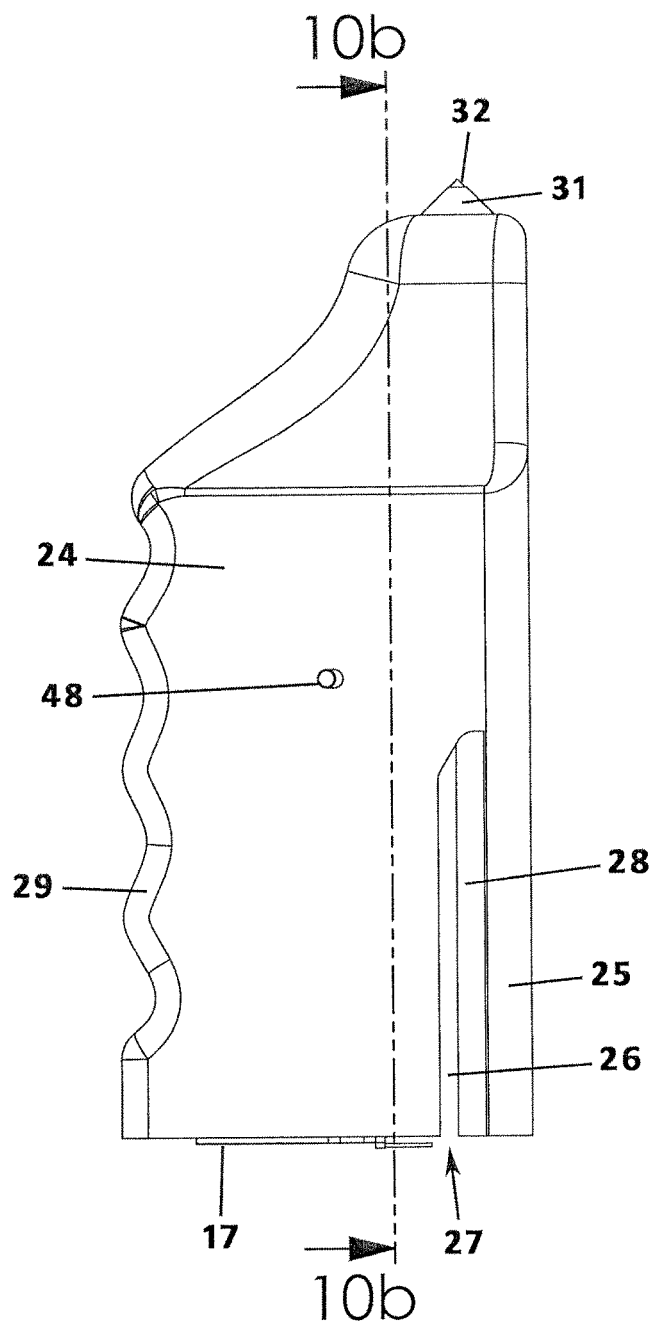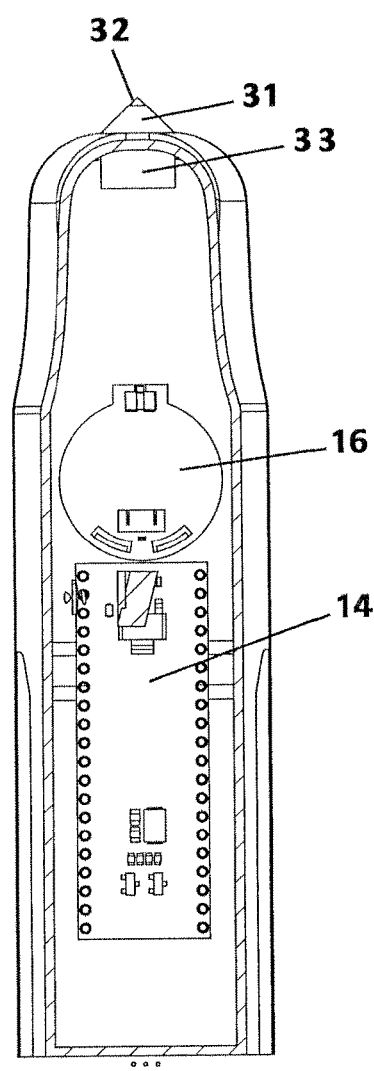
Fig. 10a
Fig. 10b

EMERGENCY ESCAPE TOOL

BACKGROUND OF THE INVENTION

This invention relates generally to multi-functional life saving tools and, more particularly, to an emergency escape tool that enables a driver or passenger of an automobile to escape from a vehicle that has become submerged in water.

If a driver or passenger in an automobile is involved in a collision with another vehicle or even a one-car accident like leaving the roadway, he may not only have injuries to his body to contend with but also the challenge of getting out of the wrecked vehicle which may be on fire or submerged in water. In some automobiles, the automatic windows and door locks may not operate after an impact or simply be too bent up to operate effectively. Essentially, the occupants of the automobile may be trapped until assistance arrives to cut the car apart with special equipment. Unfortunately, if there is fire or water on the interior of the automobile yet the seatbelts remain locked and the windows and doors remain closed, the fate of the occupants, especially if injured already, is in great peril.

Various devices have been proposed in the prior art for breaking out a window of an automobile and for cutting loose a seatbelt. Although presumably effective for their intended purposes, the existing devices and proposes do not provide an effective multi-functional escape tool that may be mounted to a vehicle seat for convenient access by a driver who needs to escape from an automobile by breaking a window, cutting loose a seatbelt, and to gain access to the tool even if the automobile is submerged in water.

Therefore, it would be desirable to have an emergency escape tool that is multi-functional to enable an automobile passenger to break a window, cut loose a seatbelt, and to be accessible by flotation and illumination in case the automobile is submerged in water.

SUMMARY OF THE INVENTION

An emergency escape tool for breaking a glass window and cutting a seatbelt of an automobile according to the present invention includes a body member having a lower end, an upper end opposite the lower end, a front side, a back side that is offset from the front side, wherein the walls of the body member defines an interior area. The walls of the body member define a slot and a blade is mounted therein, the blade being capable of severing a seatbelt of the automobile. The emergency escape tool includes a hammerhead portion coupled to the upper end of the body member and having a conical shape and that includes a diamond tip extending away from the upper end that is operable to break the glass window of the automobile. An immersion sensor is coupled to the body member and operable to detect immersion in water. The body member may be coupled to a seat of the automobile. A discharge member is associated with the body member is operable to release the body member away from a mounting portion if immersion in water is detected.

Therefore, a general object of this invention is to provide an emergency escape tool that is mountable to a seat of an automobile and is accessible to a driver or passenger needing to break a window or cut loose a seatbelt in order to escape from the automobile.

Another object of this invention is to provide an emergency escape tool, as aforesaid, having a hammerhead tip that includes a diamond material for enhanced glass breakage.

Still another object of this invention is to provide an emergency escape tool, as aforesaid, having a blade for cutting a seatbelt and that is shielded against inadvertent contact.

Yet another object of this invention is to provide an emergency escape tool, as aforesaid, having an immersion sensor for detecting when the emergency escape tool is currently under water.

A further object of this invention is to provide an emergency escape tool, as aforesaid, having a solenoid component for automatically releasing the emergency escape tool from its mounting to a vehicle seat if the immersion sensor detects submersion in water.

A still further object of this invention is to provide an emergency escape tool, as aforesaid, that is buoyant and illuminated when released into water.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is an isolated view on an enlarged scale taken from FIG. 4a;

FIG. 9b is a sectional view taken along line 9b-9b of FIG. 9a;

FIG. 9c is a sectional view taken along line 9c-9c of FIG. 9a;

FIG. 10a is another side view of the emergency escape tool as in FIG. 7;

FIG. 10b is a sectional view taken along line 10b-10b of FIG. 10a;

FIG. 11a is another side view of the emergency escape tool as in FIG. 9a;

FIG. 11c is another side view of the emergency escape tool as in FIG. 11a;

DESCRIPTION OF THE PREFERRED EMBODIMENT

Figure 1:
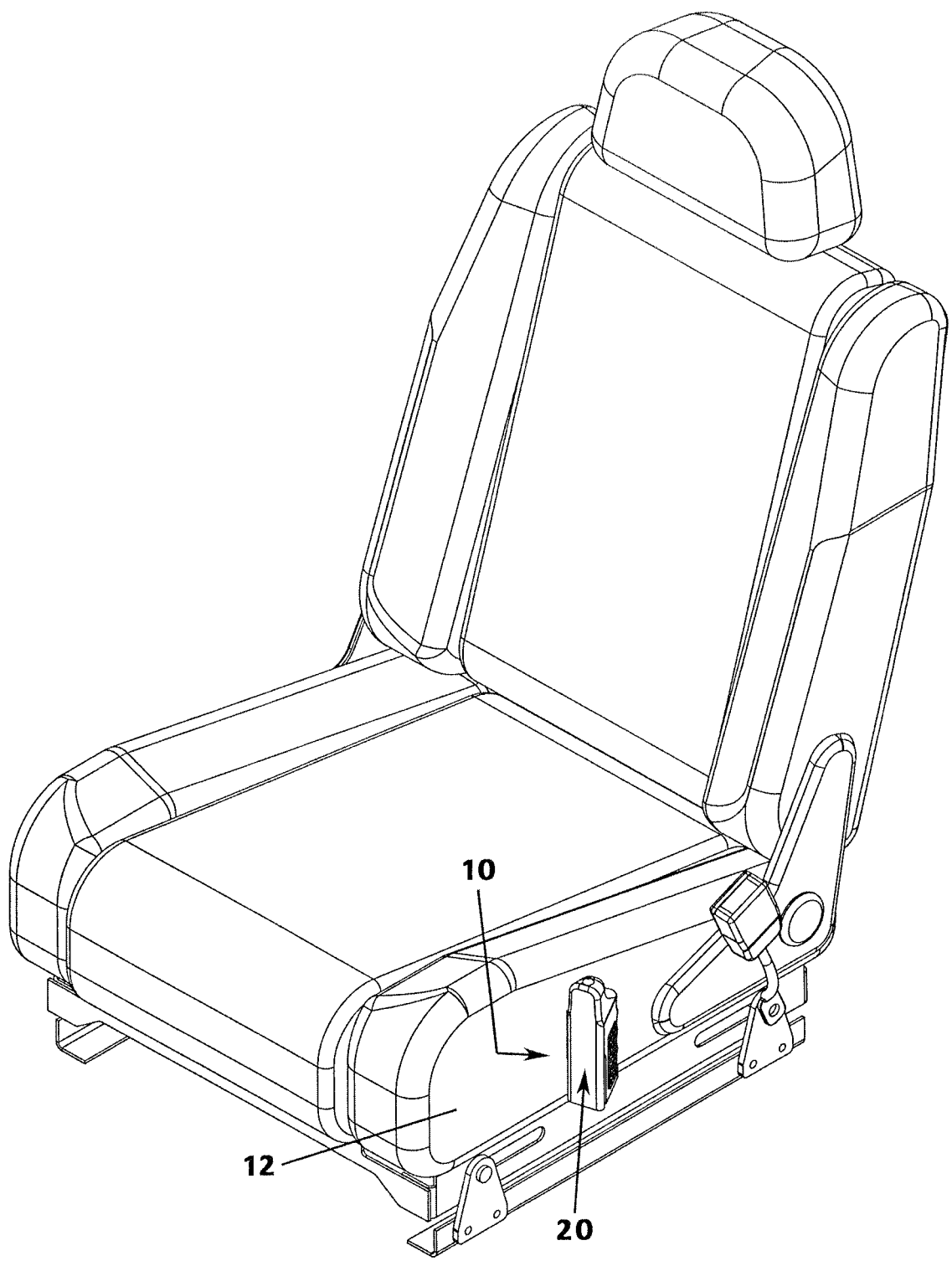
FIG. 1 is a perspective view of an emergency escape tool according to the present invention, illustrated mounted to an automobile seat.
Figure 2:
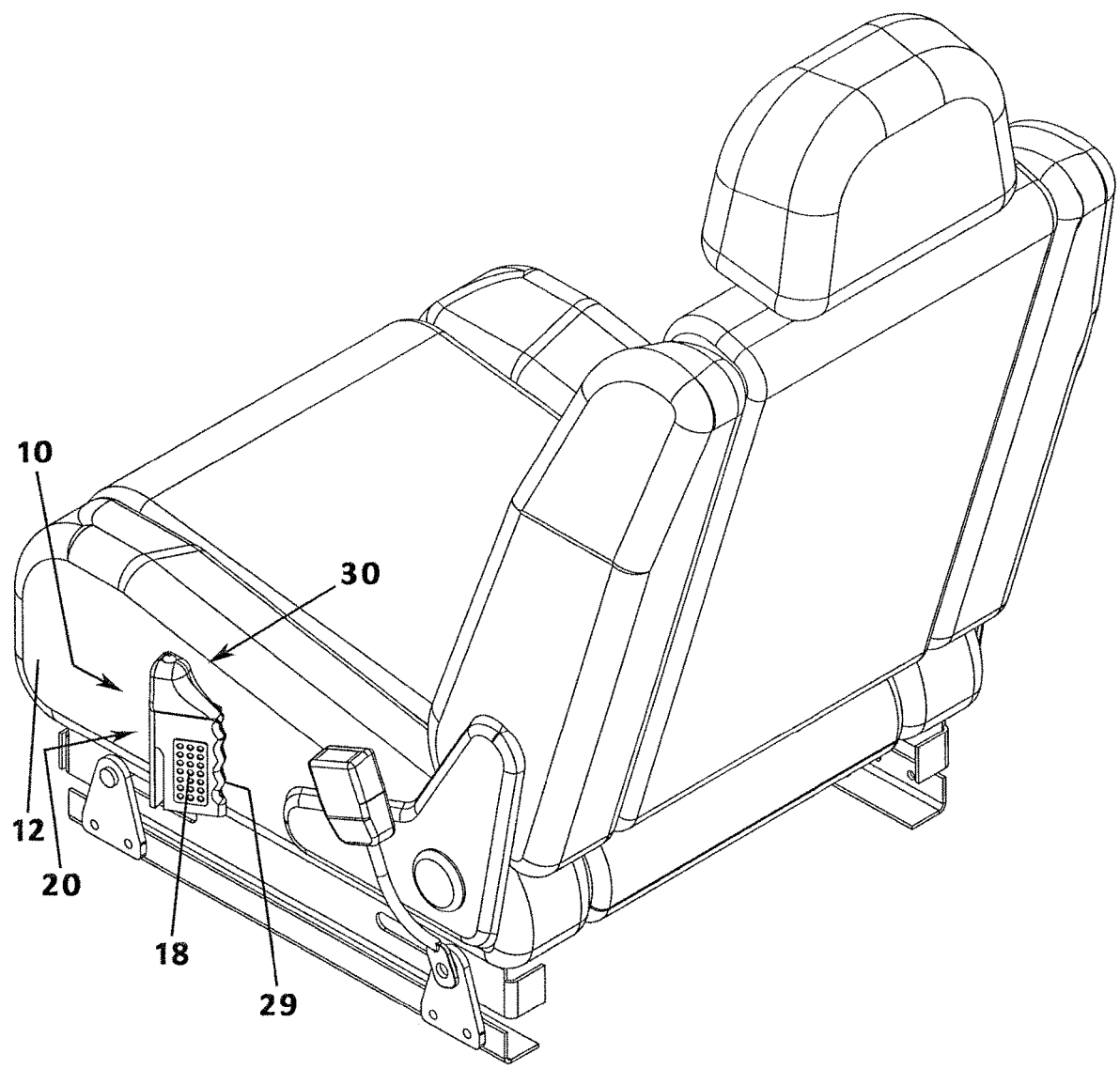
FIG. 2 is a perspective view from another angle of the emergency escape tool as in FIG. 1.
Figure 3:
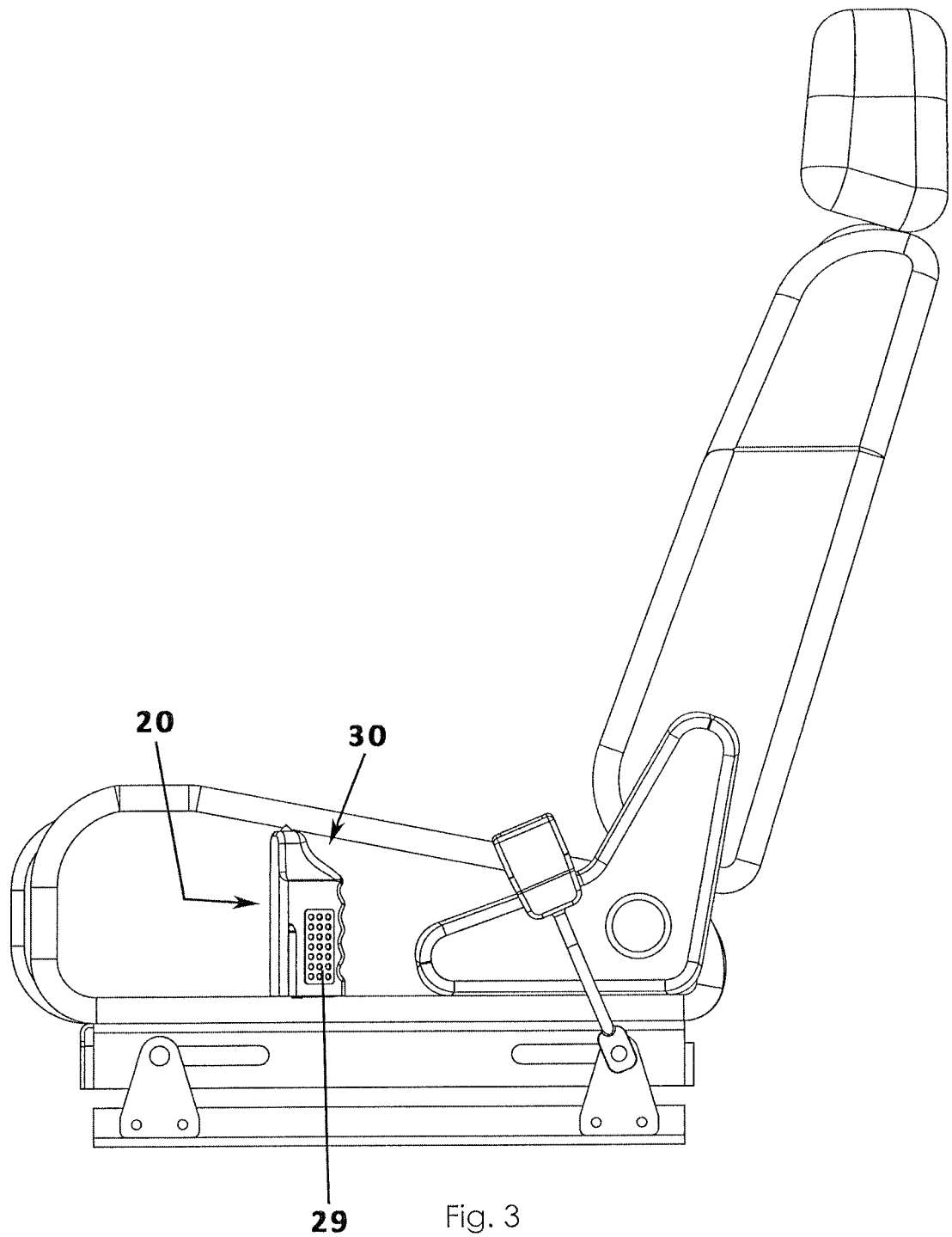
FIG. 3 is a side view of the emergency escape tool as in FIG. 1.
Figure 4A:
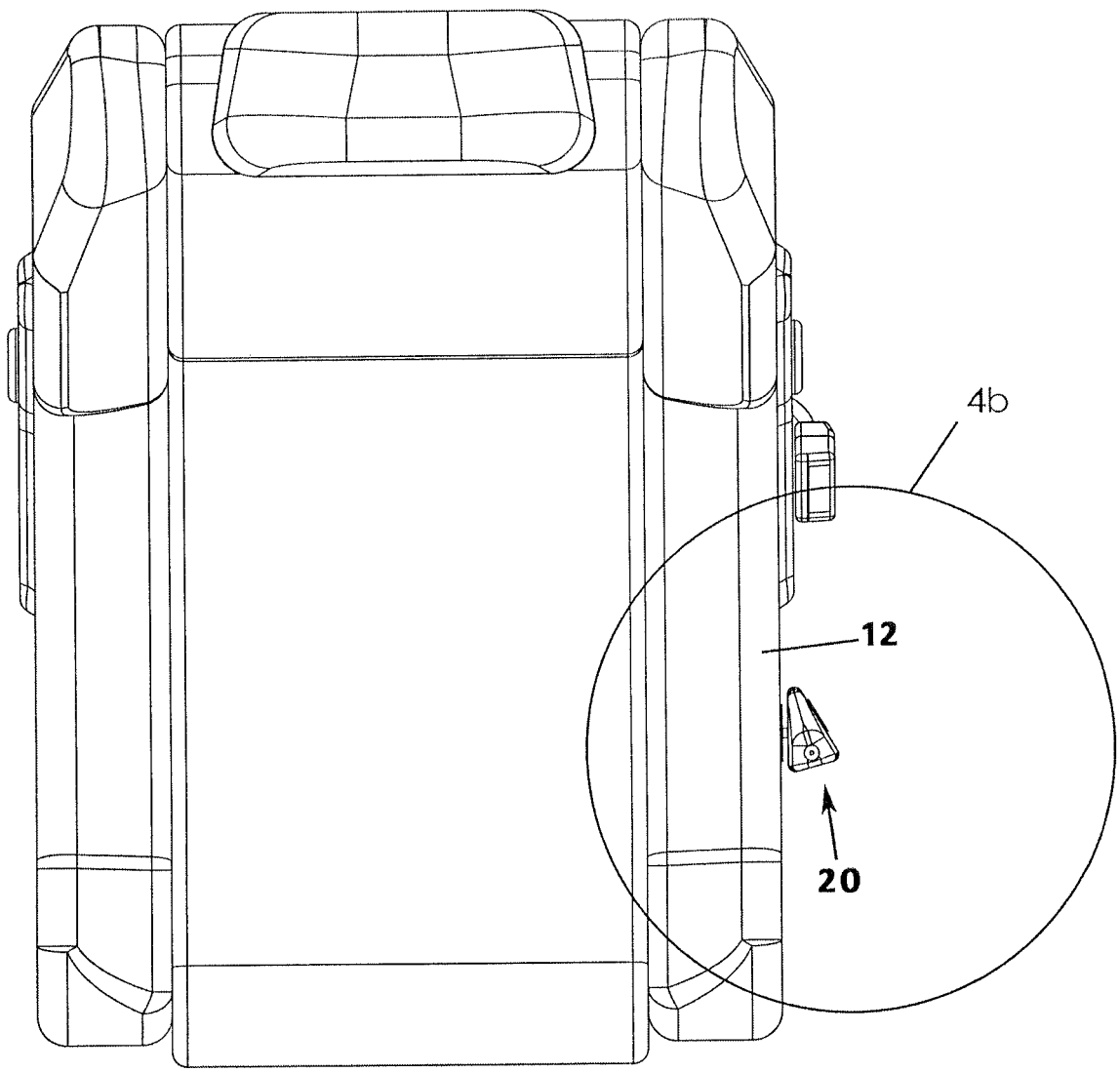
FIG. 4a is a top view of the emergency escape tool as in FIG. 1, illustrated in a configuration released from its mounting to an automobile seat.
Figure 4B:
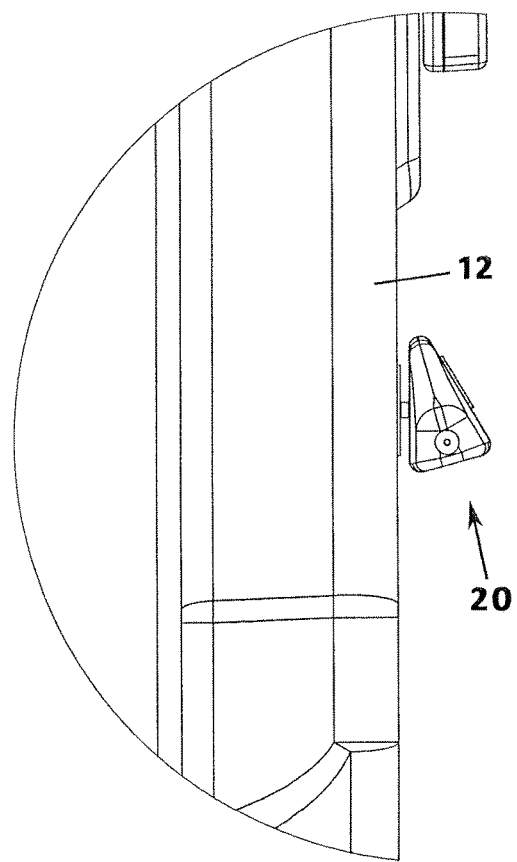
Figure 4C:
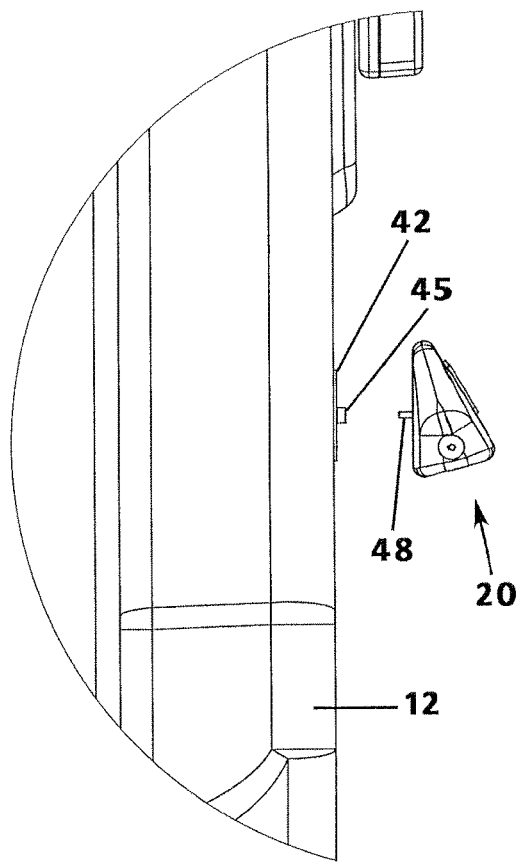
FIG. 4c is another isolated view on an enlarged scale as in FIG. 4b, illustrated with the body of the escape tool released from a mounting portion.
Figure 5:
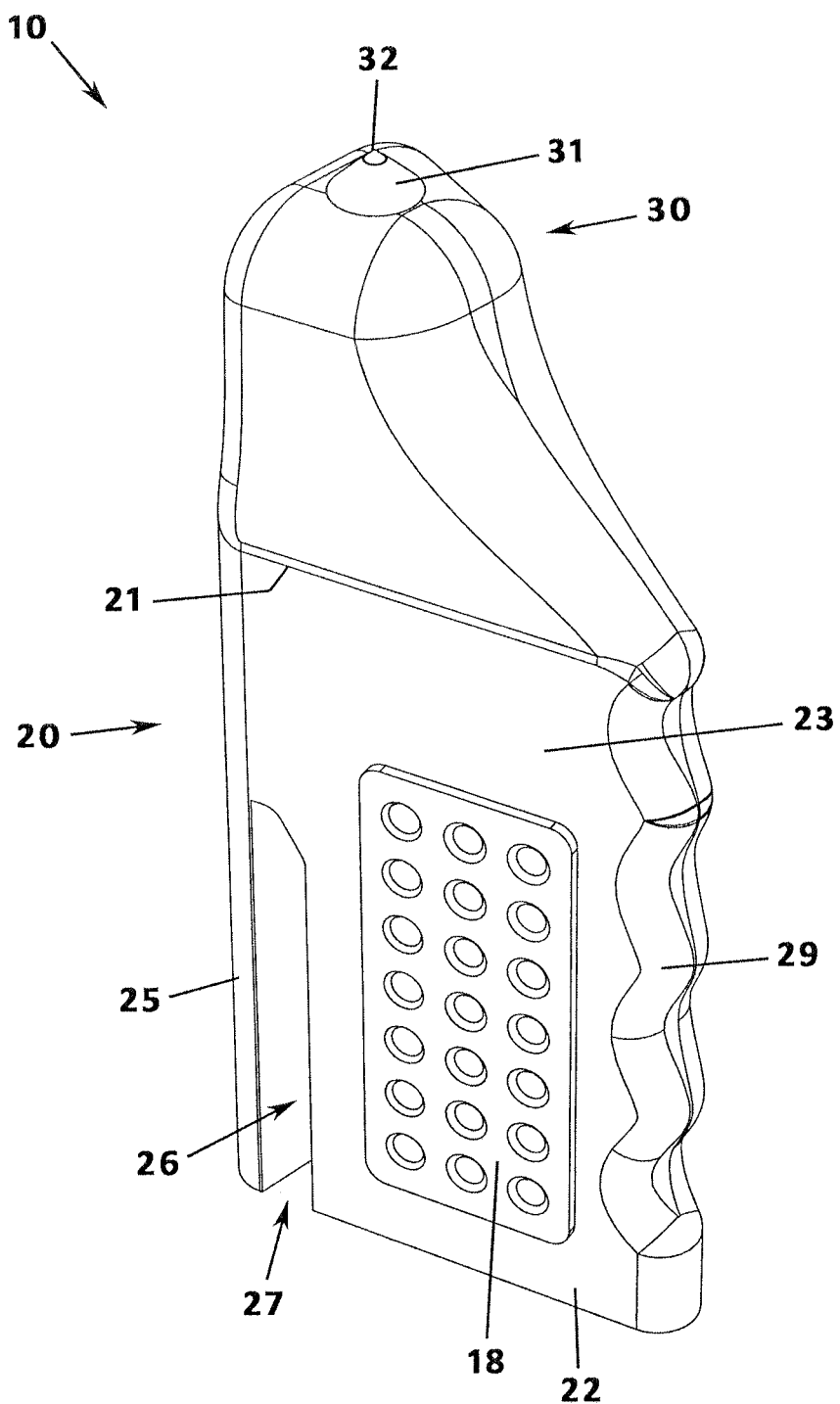
FIG. 5 is a perspective view of the emergency escape tool as in FIG. 1, illustrated removed from the automobile seat.

An emergency escape tool for breaking a glass window and cutting a seatbelt of an automobile according to a preferred embodiment of the present invention will be described in detail with reference to FIGS. 1 to 14 of the accompanying drawings. The emergency escape tool 10 includes a body member 20, a glass breakage assembly 30, a cutting blade 28, an immersion sensor 17, and a separation assembly 40 for deploying the emergency escape tool 10 away from an automobile seat or seat frame 12 to which it is normally attached.

The body member 20 is a housing to which other functional components are attached or inside which other components are contained as will be described below. More particularly, the body member 20 may include an upper end 21 and a lower end 22 opposite the upper end 21. A front side 23 and a back side 24 are walls of the body member each having a generally flat or planar configuration and that extend between the upper end 21 and lower end 22. In an embodiment, the back side 24 may be offset relative to the front side 23 so that the body member 20 has a cross-sectional appearance of a triangle. In other words, the front side 23 and back side 24 are not parallel to one another. Rather, a back side 24 is coupled to or has a unitary construction extending between rear edges of the front side 23 and back side 24, respectively. Stated another way, the side wall 25 also has a flat configuration and essentially provides a third side wall of the body member 20. As shown in the accompanying figures, the front side 23, back side 24 and side wall 25 are vertical or upstanding so that opposed upper and lower ends have a generally triangular shape.

Figure 7:
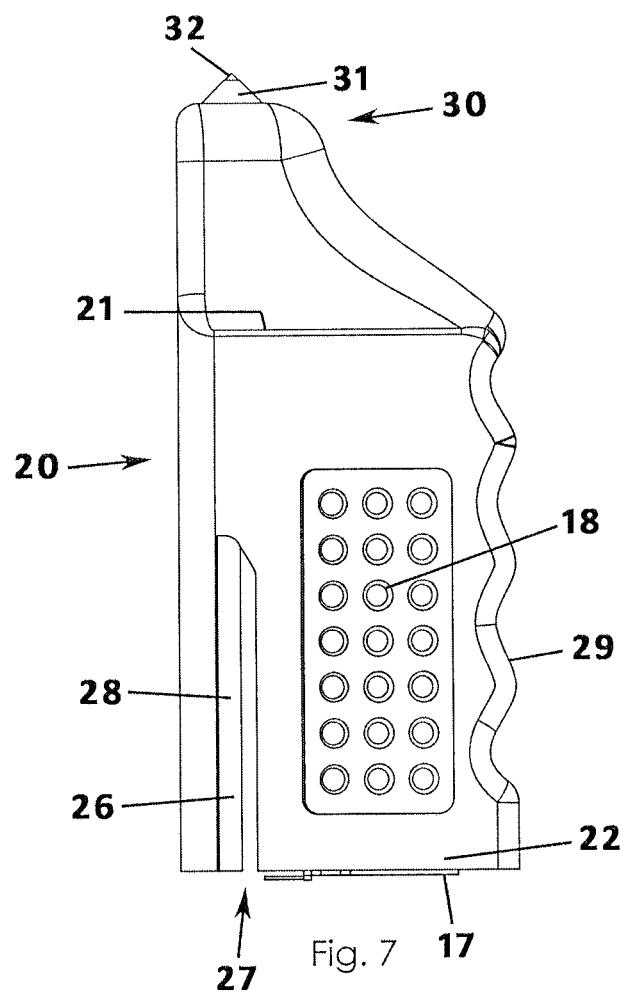
FIG. 7 is a side view of the emergency escape tool as in FIG. 5.

In another aspect, the front side 23, back side 24 and side wall 25, together, define and form a slot 26, the slot 26 extending side-to-side between the front side 23 and back side 24. The slot 26 is adjacent the side wall 25 and is accessible via a slot opening 27 defined by the lower end wall (FIGS. 5, 7, 8, and 9*c*). Further, a cutting blade 28 is positioned in the slot 26 and may be fixedly attached to an inner surface of the side wall (FIG. 7). The cutting blade 28 includes a razor sharp edge capable of a cutting seatbelt of an automobile while the upstanding walls of the body member 20 prevent a user's hands from inadvertently making contact with the cutting blade 28. In use, a user trapped in his seatbelt may move the escape tool 10 so that the seatbelt slides into the slot 26 and bears against the cutting blade 28 until the seatbelt is severed and the user is released.

In another aspect, the emergency escape tool 10 includes a glass breakage assembly 30 in case a user (e.g. a driver or passenger in the automobile) is trapped because the door of the automobile will not open and a door window needs to be broken out. In an embodiment, the glass breakage assembly 30 is coupled to and extends away from the upper end 21 of the body member 20. The glass breakage assembly 30 includes a hammerhead portion 31 and a metal support member 33. More particularly, the hammerhead portion 31 has a conical shape configuration and is itself constructed of a hard material. Further, a tip 32 is coupled to the hammerhead portion 31 and extends away therefrom. Preferably, the tip 32 is constructed or includes a diamond in that diamonds are known to have a hardness greater than that of tempered glass and likely to break the glass of a window. To provide an enhanced hardness, a support member 33 constructed of a metal such as iron or an alloy such as steel is positioned or embedded beneath a surface of an upper wall of the glass breakage assembly 30, the support member 33 being immediately adjacent the hammerhead portion 31.

It is understood that some or all of the electronic components discussed below may be included on one or more integrated circuits, via electrical wires, with Bluetooth wireless communications, or other means for electronic components and communications. Further, a processor 14, controller, or central processing unit (CPU) may be utilized in lieu of wiring and circuits and may operate with or without computer programming as will be understood by those of ordinary skill in the art.

Figure 6:
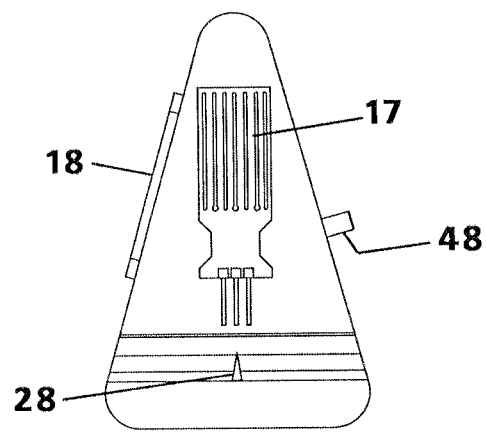
FIG. 6 is a bottom view of the emergency escape tool as in FIG. 5.

In another aspect, a battery 16 may be positioned in the interior area of the body member 20 and is operable to energize and power all other electronic components electrically connected thereto as described below. For instance, an immersion sensor 17 may be attached to an outer surface of a respective wall of the body member 20, such as to the lower end wall 22 of the body member 20 as shown in FIGS. 6 and 7 of the drawings. The immersion sensor 17 may be electrically connected to the battery 16. An immersion sensor 17 is operable to detect when the sensor is submersed in water. In an embodiment, the immersion sensor 17 is a moisture sensor in general and operable to detect any presence of water whether or not the detector itself is completely submerged. When the immersion or moisture sensor detects a water event, one or more predetermined actions are actuated, such as actuating the separation assembly, energizing a plurality of light emitting diodes (LEDs), or both, as will be described below.

Figure 8:
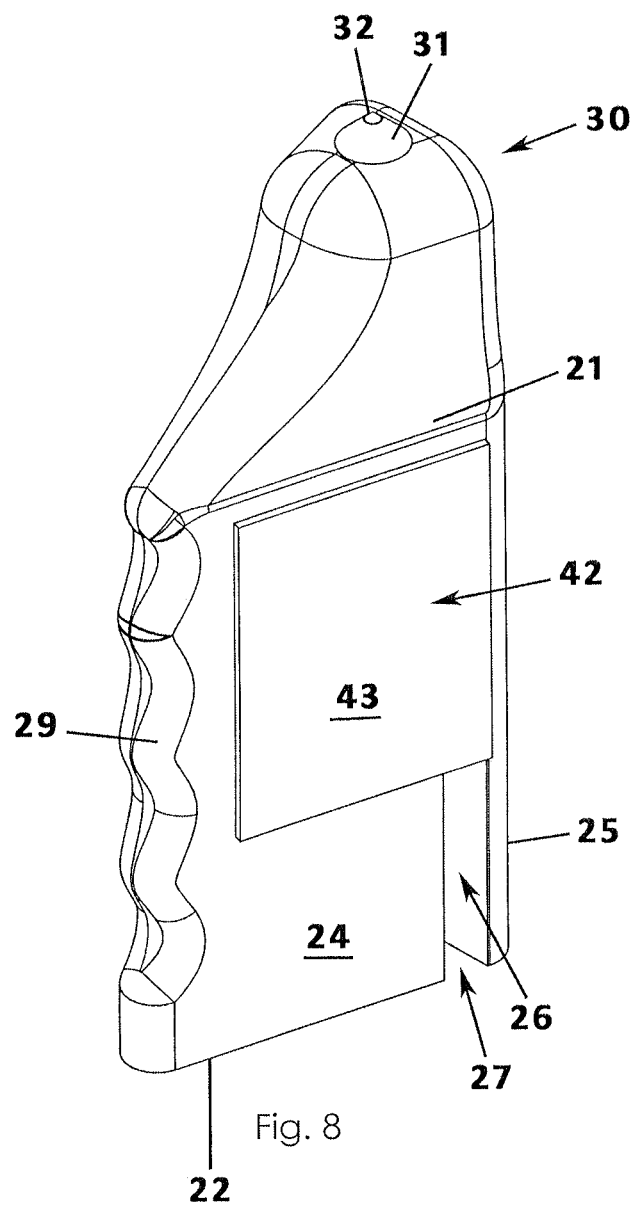
FIG. 8 is a back view of the emergency escape tool as in FIG. 5.

In a related aspect, the emergency escape tool 10 includes a separation assembly 40 so that the tool itself can be removed from attachment to a seat or seat frame 12 of the automobile to which it is installed. The separation assembly 40 includes a mounting portion 41 by which the body member 20 may be coupled to an automobile seat frame 12 and a discharge member 46 by which the body member 20 may be automatically released from attachment to the seat, such as when a predetermined amount or level of water is detected. The mounting portion 41 includes a mounting plate 42 having a generally planer configuration and having an outer surface and an opposing inner surface 44. The outer surface 43 may include an adhesive material operable to adhere to a frame of a vehicle seat or seat frame 12 (FIGS. 1 and 8). The inner surface 44 of the mounting plate 42 includes a hub 45 operable to releasably receive and be engaged by the external portion 48 of the discharge member 46 as described below.

The discharge member 46 includes an internal portion 47 situated inside the interior area of the body member 20 and an external portion 48 coupled to the internal portion 47 and extending away therefrom and normally and initially engaged with the hub 45 of the mounting plate 42. The discharge member 46 is operable and configured to move between a stowed configuration in which the external portion 48 is received into the hub 45 and a deployed configuration in which the external portion 48 is released from the hub 45 and the body member 20 is forcibly urged away from the mounting plate 42. For instance, the discharge member 46 may be a solenoid. A solenoid includes a coil that surrounds a plunger for actuating movement of the plunger when electrically actuated. Take, for example, an electromagnet door lock that is operable to operate the locking shaft or pin of a lock when the electromagnet door lock is energized—such as by detecting that a respective lock has been unlocked. More particularly, the discharge member 46 may be a solenoid or an equivalent component that, when energized by electrical current, not only releases an object coupled to the solenoid, but may actually eject or push the object away from the solenoid. The solenoid acts in the manner of an electromagnet and is activated only when receiving an electrical current and being useful for moving a plunger when actuated by an electrical charge. Preferably, the solenoid is in electrical communication with the battery 16 and with the immersion sensor 17 and the internal portion 47 may be positioned in the interior area of the body member 20 with the external portion 48 extending outward from the body member 20. Specifically, the solenoid of the discharge member 46 is configured to normally hold the external portion 48 in a position engaged with the hub 45 (i.e. a stowed configuration) but is operable to release the engagement with the hub 45 when the solenoid is energized with electrical current, such as from the battery 16 (i.e. a deployed configuration). In the manner of a solenoid controlled door lock, the external portion 48 of the solenoid may eject or forcefully separate from hub 45 and mounting portion 41 when energized. It is understood that operation of the solenoid causes the body member 20 to be released and separated from its mounting to the automobile seat when the automobile cabin is experiencing a water event, e.g. the automobile has crashed into a creek, lake, or other body of water that may cause a driver or passenger to be trapped.

In another aspect, the emergency escape tool 10 may include a plurality of light emitting diodes (LEDs) 18 electrically connected to the battery 16 and to the separation assembly 40 described above. The plurality of LEDs 18 may be mounted to a wall of the body member 20, such as to the front side 23 thereof. In an embodiment, the LEDs 18 are operable to be energized to emit light simultaneously with actuation of the discharge member 46. In other words, when the body member 20 is released upon detection of being partially or completely immersed in water, the LEDs 18 are energized to emit light—either blinking or constant—so that the driver is better able to locate and access the tool floating in the water. In a related embodiment, the body member 20 may include a tether, such as a cord or a string, that is operable to keep the body member 20 in proximity to the seat frame even if floating so that the user can find it floating.

Figure 13:
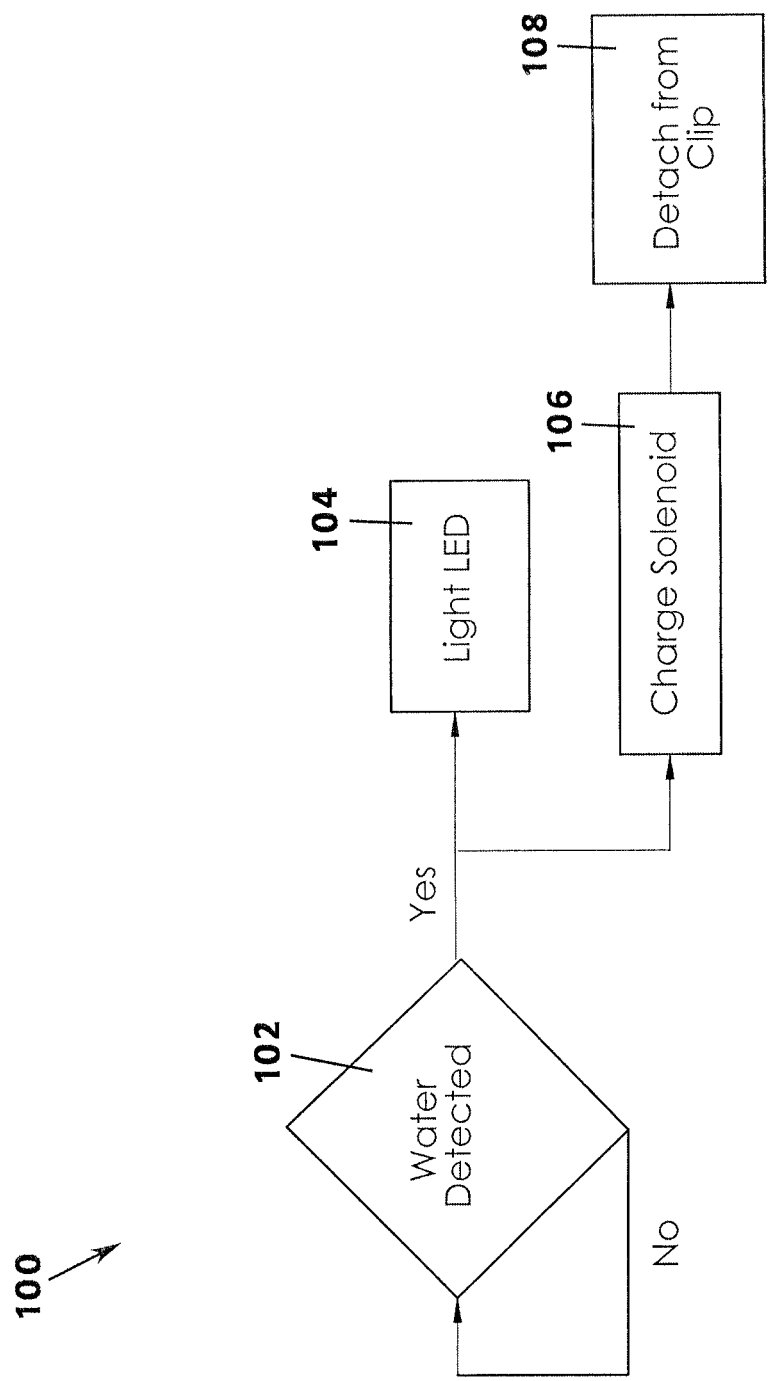
FIG. 13 is a flowchart illustrating the conditions and operation of energize a plurality of LEDs and the discharge member.
Figure 14:
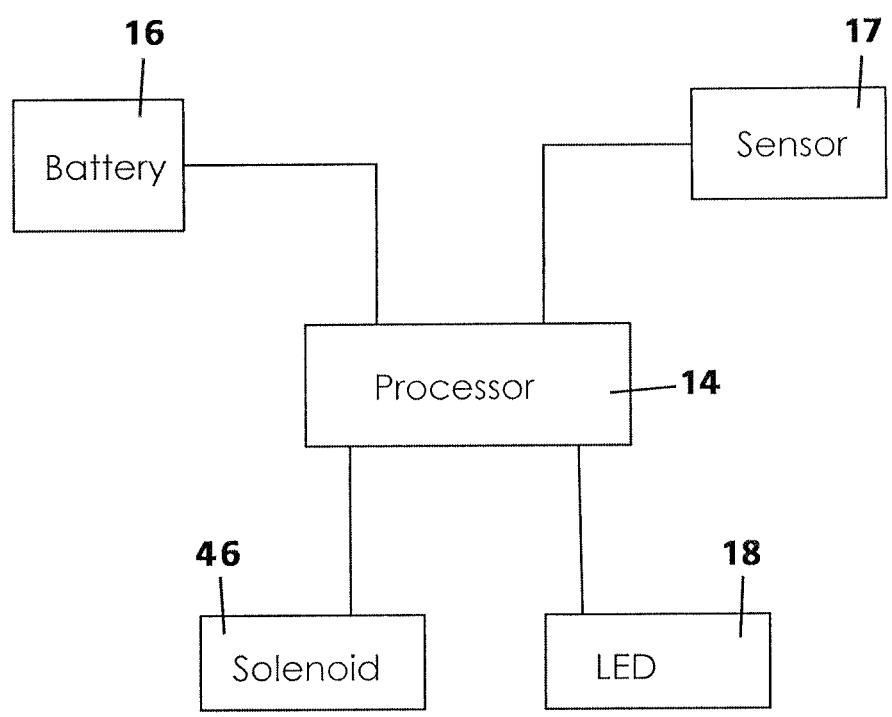
FIG. 14 is a block diagram illustrating the electronic components of the present invention.

An exemplary process 100 illustrated in FIG. 13 explains a preferred method for energizing the plurality of LEDs 18 and actuating a release of the body member 20 from the mounting portion 41. At step 102, the immersion sensor 17 determines if moisture is detected and, if so, proceeds to step 104; otherwise, the immersion sensor 17 continues to monitor for the presence of water indicative that the automobile is submerged. It is understood, of course, that the monitoring for detection of moisture may be actuated by a processor 14 and via programming (FIG. 14). When moisture indicative of an immersion of the automobile, the plurality of LEDs 18 may be energized at step 104 and the discharge member 46 (which may include a solenoid) may be simultaneously energized (charged) to cause a forced release of the body member 20 from the mounting portion 41 of the separation assembly 40 as described above.

In an embodiment, operation of the discharge member 46 may be intentionally delayed from operation for a predetermined amount of time. In other words, the body member 20 may remain coupled to the mounting portion 41 for a predetermined number of seconds to give the driver opportunity to manually grasp and release the body member 20 from the mounting portion 41. But, if the tool is not manually released, it is assumed that the driver may not be capable of finding or operating the emergency escape tool 10, such as because the water level is overwhelming. In such an instance, the discharge member 46 (i.e. solenoid) is energized and operated to release the body member 20 to float. This operation may include operation of a microprocessor 14 associated with a non-volatile memory and suitable programming, the processor 14 being electrically connected to the battery 16, immersion sensor 17, and discharge member 46.

Figure 9B:
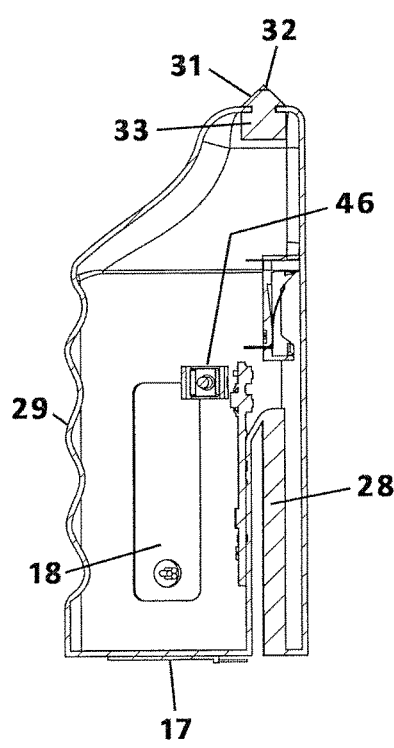
Figure 9A:
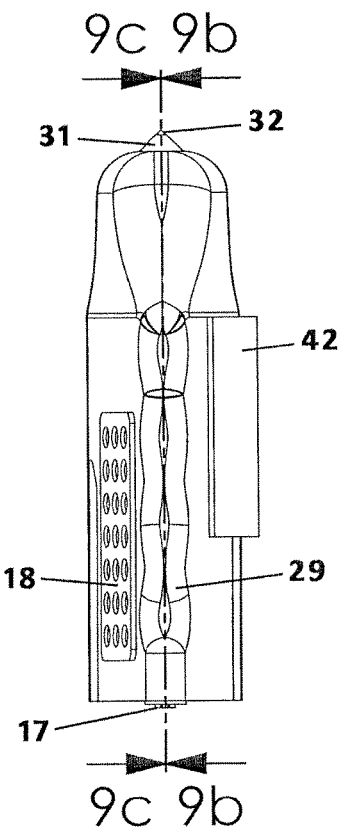
FIG. 9a is another side view of the emergency escape tool as in FIG. 5.
Figure 9C:
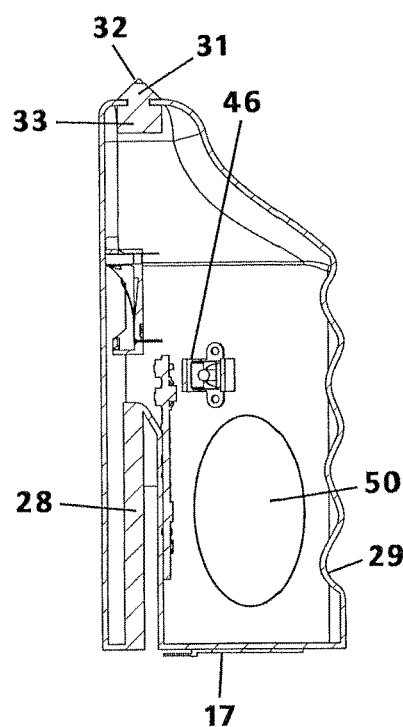
Figure 11A:
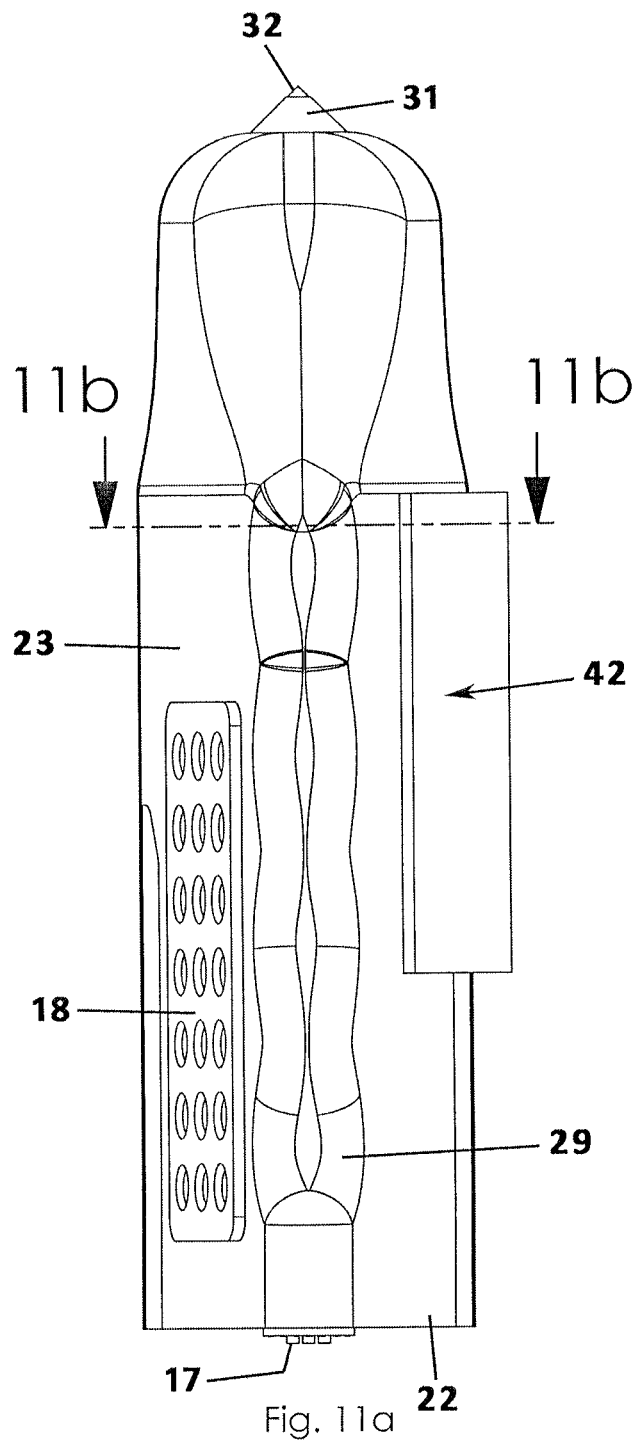
Figure 11B:
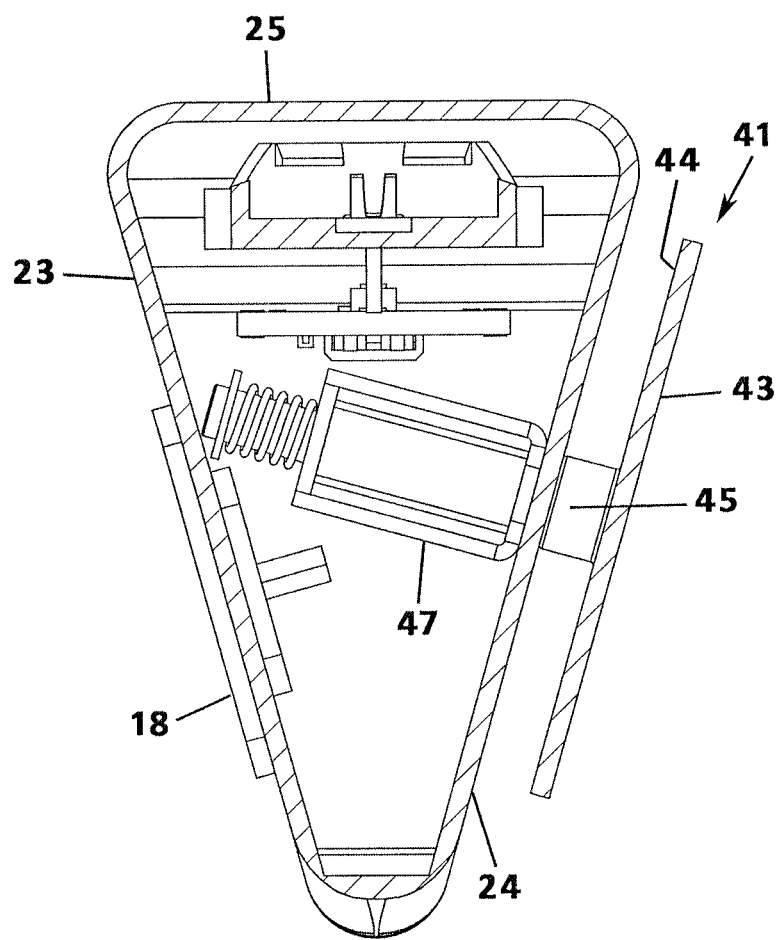
FIG. 11b is a sectional view taken along line 11b-11b of FIG. 11a, illustrating a discharge member in a stowed or normal configuration.
Figure 11C:
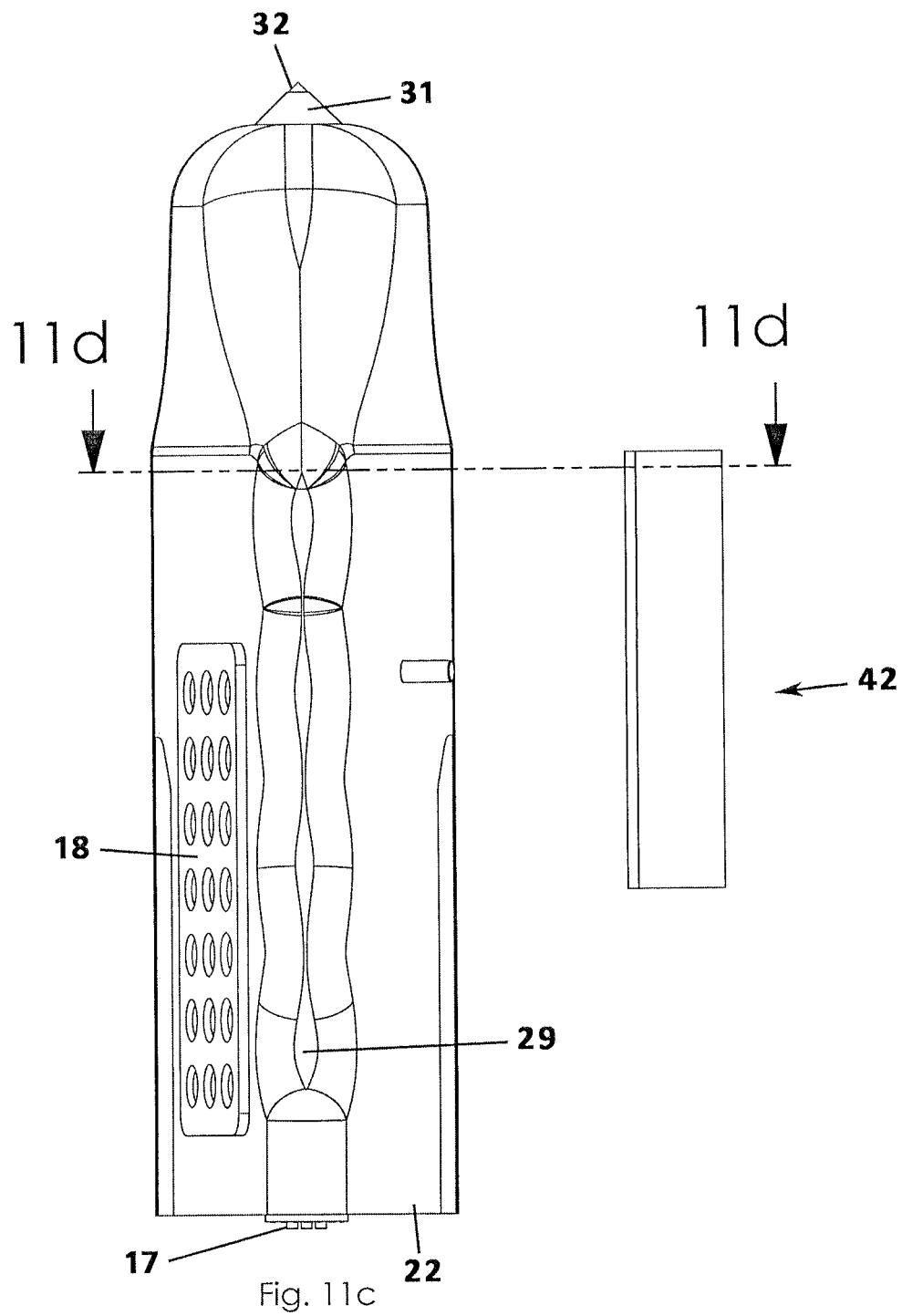
Figure 11D:
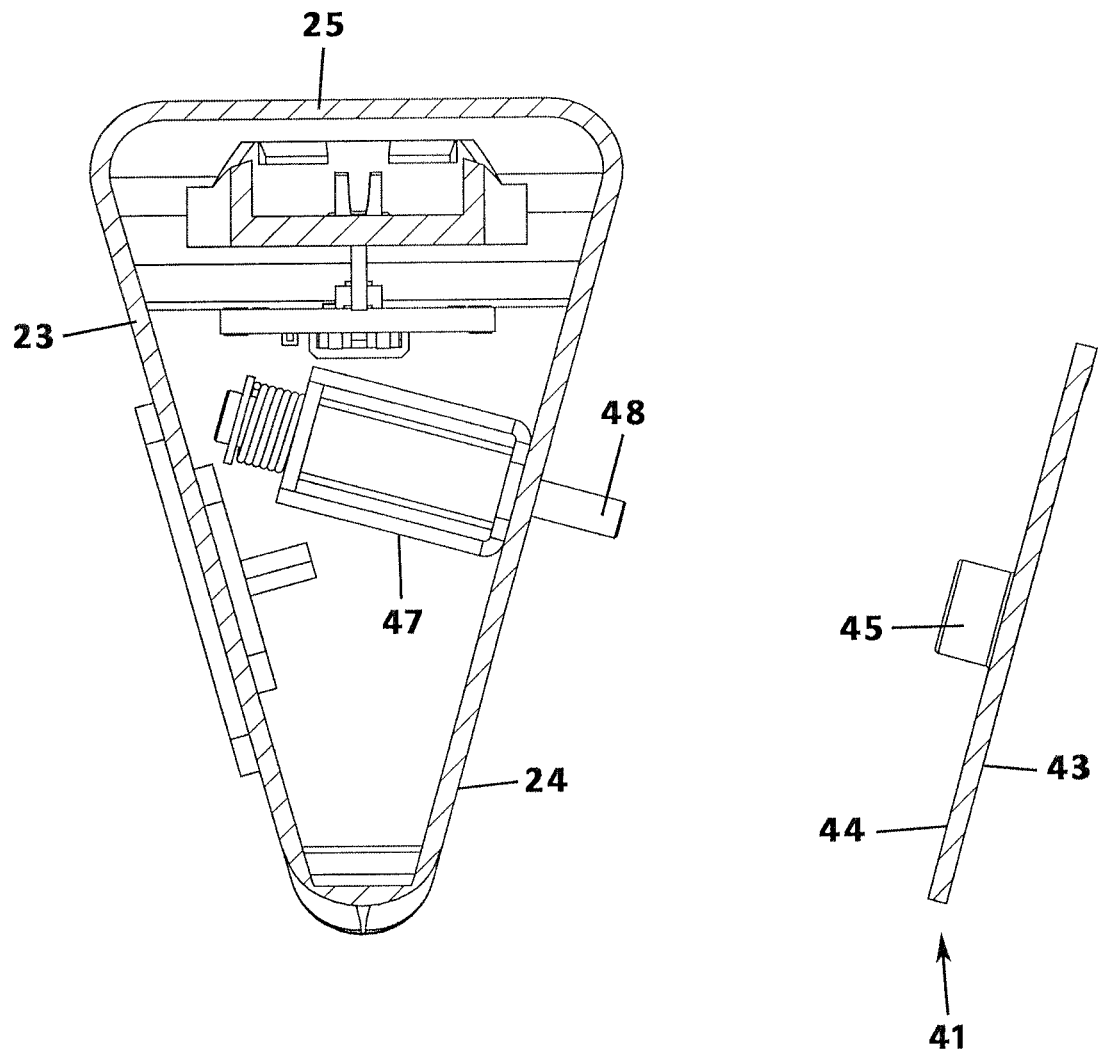
FIG. 11*d* is a sectional view taken along line 11*d*-11*d* of FIG. 11*c*, illustrating the discharge member in a deployed or released configuration.
Figures 12A, 12B:
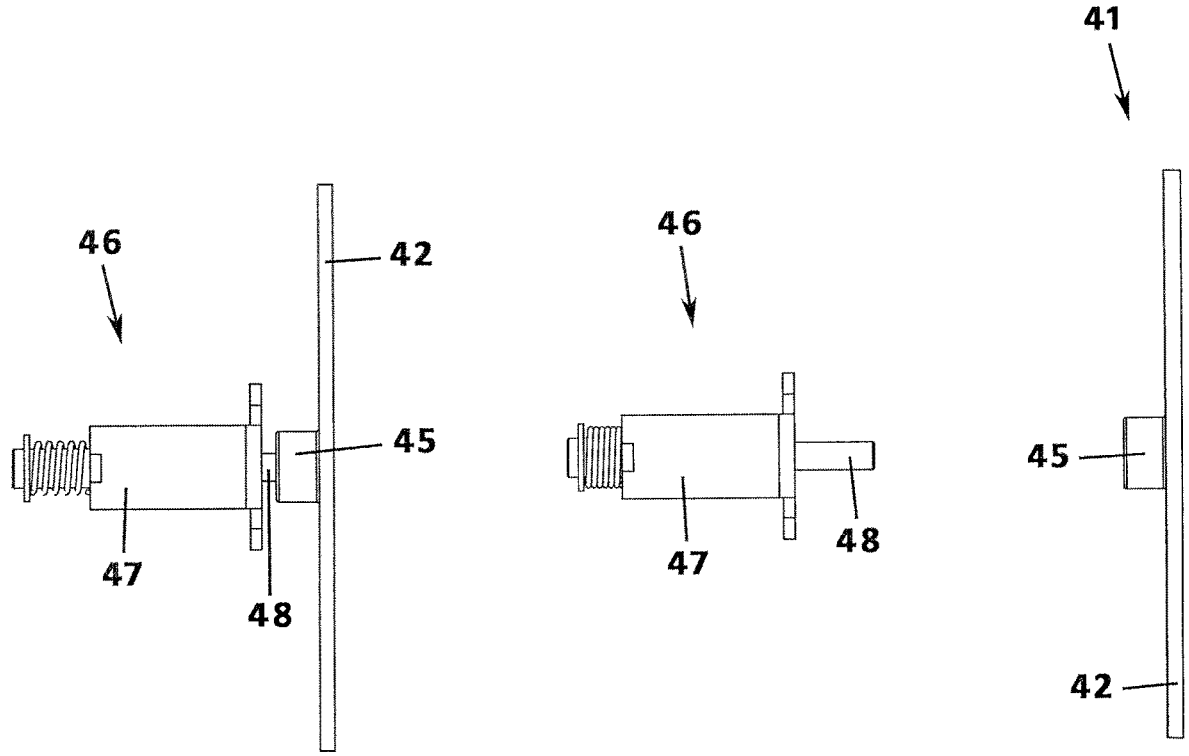
FIG. 12*a* is an isolated side view of a separation assembly according to the present invention, illustrating the discharge member in the stowed configuration.
FIG. 12*b* is another isolated side view of the separation assembly according to the present invention, illustrating the discharge member in the deployed configuration.

In yet another aspect, the emergency escape tool 10 may include a flotation member 50 operable to make the body member buoyant so as to float in the instance of a water event. The flotation member 50 may include a housing sealed and filled with ambient or compressed air and positioned in the interior area of the body member (FIG. 9c). The housing is constructed of a buoyant material such as polyethylene, polystyrene, or the like. In any case, the housing is formed of a material having a density that is less than a density of water so that it will rise upwardly in water and, eventually float atop the water.

In another aspect, the emergency escape tool 10 includes an hand grip 29 that enables the body member 20 to be gripped by the hand of a user more effectively, such as while breaking out a window of the automobile or severing the seat belt. As shown, the front side 23 and back side 24 are offset from one another and converge along a side edge extending between the upper end wall 21 and lower end wall 22. Preferably, the hand grip 29 defines a plurality of recesses adjacent to one another and that are complementary to the shape of a person's fingers.

In use, the emergency escape tool 10 is an accessory that may be mounted to a seat frame (or even to a dash or console) of an automobile in anticipation of being needed in case of a traffic accident that may render it impossible to release the driver's seatbelt or that renders a door incapable of being opened—making it necessary to break out the door window. More so, the emergency escape tool 10 is able to detect if the disabled automobile is being submerged in water and to light up and be released automatically from the automobile seat and to float atop the water in the car.

It is understood that while certain forms of this invention have been illustrated and described, it is not limited thereto except insofar as such limitations are included in the following claims and allowable functional equivalents thereof.

The invention claimed is:

1. An emergency escape tool for breaking a glass window and cutting a seatbelt of an automobile, said emergency escape tool, comprising:
    a body member having a lower end, an upper end opposite said lower end, a front side, and a back side, wherein said body member defines an interior area;
    a glass breakage assembly coupled to said upper end of said body member, said glass breakage member operable to break the glass window of the automobile;

wherein said body member defines a slot extending from said lower end to a point upwardly displaced from said lower end and having a linear configuration;

a cutting blade positioned in said slot that is operable to sever the seatbelt of the automobile;

an immersion sensor coupled to said body member that is operable to detect immersion in water;

a separation assembly comprising:
  a mounting member having an outer surface operable for mounting to the automobile seat and having an inner surface that includes a mounting hub;
  a discharge member mounted in said body member and normally coupled to said mounting hub of said mounting member;
wherein said discharge member is operable for movement between a stowed configuration in which said discharge member is coupled to said mounting hub and a deployed configuration in which said discharge member is released and displaced from said mounting hub;
wherein said discharge member is a solenoid operable such that, when energized releases and urges said body member away from said mounting hub.

2. The emergency escape tool as in claim 1, wherein:
said body member includes a side wall extending between rear edges of said front side and said back side, respectively, such that said body member has a triangular-shaped cross-section, said slot being defined by and extending between said front side and said back side; and
said cutting blade is coupled to said side wall and positioned in said slot parallel to said side wall.

3. The emergency escape tool as in claim 1, wherein said emergency glass breakage assembly includes:
  a hammerhead portion having a conical shape and a tip extending away from said hammerhead portion;
  a metal support member embedded beneath a surface of said hammerhead portion.

4. The emergency escape tool as in claim 3, wherein said tip of said emergency glass breakage assembly includes a diamond.

5. The emergency escape tool as in claim 1, wherein said discharge member includes an internal portion positioned in said interior area of said body member and an external portion coupled to and extending away from said interior area, said body member being releasably coupled to said external portion of said discharge member.

6. The emergency escape tool as in claim 1, wherein said outer surface of said mounting member includes an adhesive material capable of adhering to the automobile seat, said mounting member having a planar shape configuration positioned parallel to said back side of said body member when said discharge member is engaged with said mounting hub.

7. The emergency escape tool as in claim 1, further comprising a flotation member situated in said interior area of said body member and having a density that is less than a density of water and, as a result, makes said body member buoyant when surrounded by water.

8. The emergency escape tool as in claim 7, wherein said flotation member is constructed from one of polystyrene or polyethylene material having a density less than a density of water.

9. The emergency escape tool as in claim 1, wherein:
said front side is offset relative to said back side and said front side is coupled to said back side along a side edge that extends between said upper end and said lower end of said body member;
said side edge defines a grip handle having a plurality of recessed areas configured to receive the fingers of a person.

10. The emergency escape tool as in claim 1, further comprising:
  a battery positioned in said interior area of said body member; and
  a plurality of light emitting diodes (LEDs) attached to said front side of said body member and electrically connected to said battery and to said immersion sensor;
wherein said plurality of LEDs are energized to emit light when said immersion sensor detects immersion in water.

11. The emergency escape tool as in claim 1, further comprising:
  a battery positioned in said interior area of said body member; and
  a plurality of light emitting diodes (LEDs) attached to said front side of said body member and electrically connected to said battery and to said solenoid;
wherein said plurality of LEDs is energized to emit light when said discharge member 6 is at said deployed configuration.

12. The emergency escape tool as in claim 1, further comprising:
  a battery positioned in said interior area of said body member;
wherein said solenoid is electrically connected to said battery and to said immersion sensor and operable to receive current from said battery and to release and to urge said body member away from said mounting member when said immersion sensor detects immersion in water.

13. An emergency escape tool for breaking a glass window and cutting a seatbelt of an automobile, said emergency escape tool, comprising:
  a body member having a lower end, an upper end opposite said lower end, a front side, a back side that is offset from said front side, wherein said body member defines an interior area;
wherein said base member includes a side wall extending between rear edges of said front side and said back side, respectively, said side wall and said front wall and said back wall, together, defining a slot extending from said lower end to a point displaced from said lower end and having a linear configuration;
  a glass breakage member that includes a hammerhead portion coupled to said upper end of said body member and having a conical shape and that includes a tip extending away from said upper end that is operable to break the glass window of the automobile;
  a cutting blade positioned in said slot that is operable to sever the seatbelt of the automobile;
  a battery positioned in said interior area of said body member;
  an immersion sensor coupled to said body member that and electrically connected to said battery, said immersion sensor being operable to detect immersion in water;
  a mounting member having a mounting plate operable for mounting to the automobile seat having a mounting hub;
  a discharge member electrically connected to said battery and that includes an internal portion positioned in said interior area of said body member and having an external portion extending away from said interior area and normally coupled to said mounting hub of said mounting member;

wherein said discharge member is operable for movement between a stowed configuration in which said discharge member is coupled to said mounting hub and a deployed configuration in which said discharge member is released and displaced from said mounting hub.

14. The emergency escape tool as in claim 13, further comprising:
   a plurality of light emitting diodes (LEDs) attached to said front side of said body member and electrically connected to said battery and to said discharge member;
   wherein said plurality of LEDs is energized to emit light when said discharge member is at said deployed configuration.

15. The emergency escape tool as in claim 13, further comprising:
   a plurality of light emitting diodes (LEDs) attached to said front side of said body member and electrically connected to said battery and to said immersion sensor;
   wherein said plurality of LEDs are energized to emit light when said immersion sensor detects immersion in water.

16. The emergency escape tool as in claim 13, wherein said discharge member is a solenoid operable such that, when energized, said external portion releases and urges said body member away from said mounting hub.

17. The emergency escape tool as in claim 13, wherein an outer surface of said mounting member includes an adhesive material capable of adhering to the automobile seat, said mounting member having a planar shape configuration positioned parallel to said back side of said body member when said discharge member is engaged with said mounting hub.

18. The emergency escape tool as in claim 13, further comprising a flotation member situated in said interior area of said body member and having a density that is less than a density of water such that said body member is buoyant when surrounded by water.

19. The emergency escape tool as in claim 13, further comprising:
   a processor electrically connected to said battery, said discharge member, and said immersion sensor;
   a non-volatile memory in data communication with said processor and operable to include programming;
   wherein said programming, when executed by said processor, causes said processor to wait a predetermined amount of time after said immersion sensor has detected a qualifying water event and, after expiration of said predetermined amount of time, to energize said discharge member to disengage from said hub.

* * * * *